Figure 1:
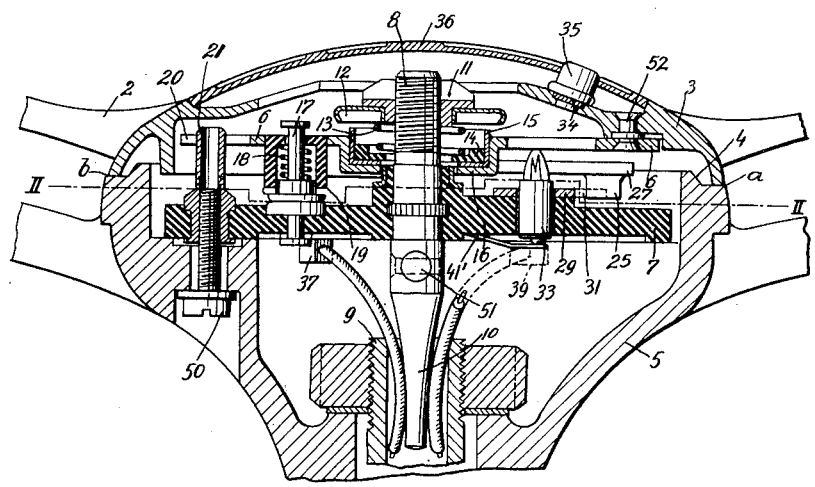

April 30, 1957    R. E. UHLENHAUT ET AL    2,790,864
ELECTRICAL CONTROL DEVICE FOR MOTOR VEHICLES
Filed May 23, 1955                         2 Sheets-Sheet 1

Inventors
RUDOLF E. UHLENHAUT,
ALFRED FR. ROTHWEILER
AND EMIL FR. K. WENGERT
BY Dicke and Craig
ATTORNEYS.

April 30, 1957   R. E. UHLENHAUT ET AL   2,790,864
ELECTRICAL CONTROL DEVICE FOR MOTOR VEHICLES
Filed May 23, 1955   2 Sheets-Sheet 2
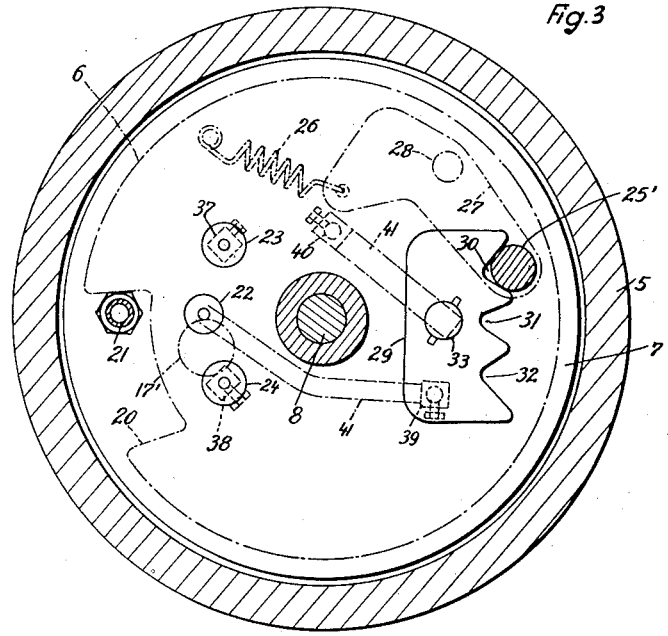
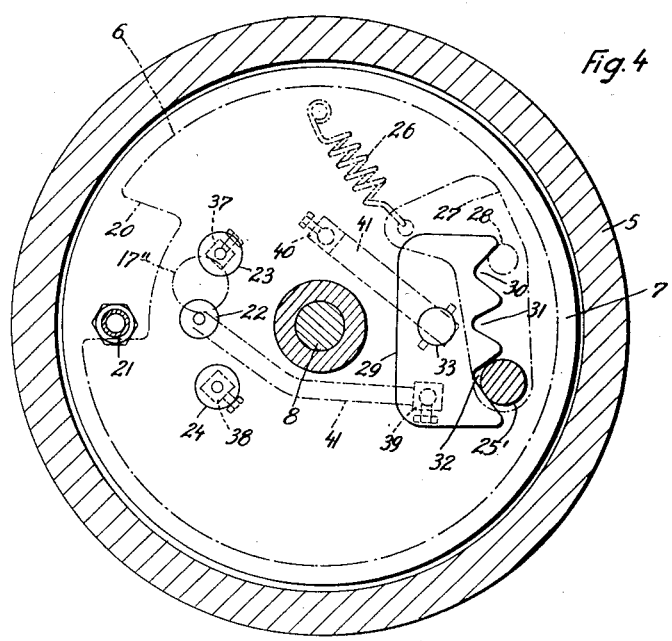
Inventors
RUDOLF E. UHLENHAUT,
ALFRED FR. ROTHWEILER
AND EMIL FR. K. WENGERT
BY Dicke and Craig
ATTORNEYS.

United States Patent Office 2,790,864
Patented Apr. 30, 1957

2,790,864

ELECTRICAL CONTROL DEVICE FOR MOTOR VEHICLES

Rudolf E. Uhlenhaut, Stuttgart, Alfred F. Rothweiler, Oberesslingen, and Emil F. K. Wengert, Stuttgart, Germany, assignors to Daimler-Benz Aktiengesellschaft, Stuttgart-Unterturkheim, Germany Application May 23, 1955, Serial No. 510,106
In Germany April 25, 1949

Public Law 619, August 23, 1954
Patent expires April 25, 1969

6 Claims. (Cl. 200—61.38)

The present invention relates to an improved electric control device for the equipment of motor vehicles, particularly for operating the horn and turn indicators. More particularly, the invention relates to a control device of the kind comprising an actuating wheel mounted on the steering wheel and adapted to be turned for selecting and operating a turn indicator and to be tilted for sounding the horn.

It is the object of the present invention to provide an electric control device of the type indicated in which the actuating wheel is of uniform sensitivity throughout its entire periphery and in which the tilting angle causing the horn to sound may be adjusted within wide limits and may be made very small rendering the horn-sounding switch extremely sensitive.

A further object of the invention is to so reorganize the elements of the control device that it is extremely compact and requires a minimum of space whereby the hub portion of the steering wheel and of the actuating wheel may be given small dimensions.

It is a further object of the invention to provide an electrical control device of the type indicated in which the operating elements are protected from dust and are nevertheless easily accessible.

Further objects of our invention will appear from a detailed description following hereinafter of a preferred embodiment shown in the accompanying drawings, it being understood, however, that such detailed description serves the purpose of illustrating the invention rather than that of limiting or restricting the same.

Figure 2:
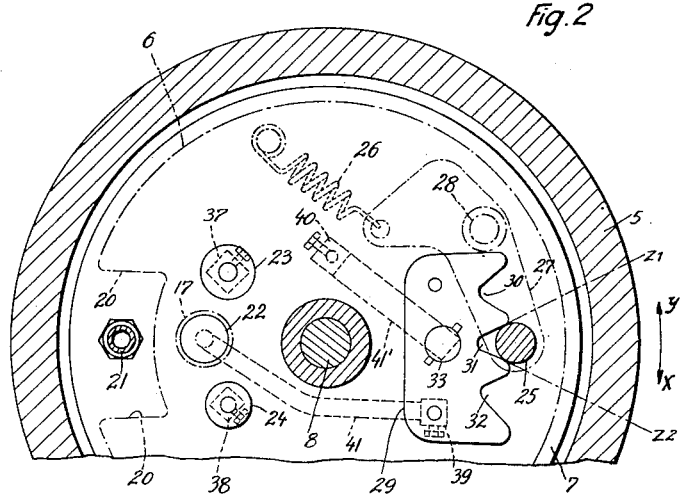

In the drawings,

Fig. 1 is a diagrammatical section taken through the hub portion of the steering wheel for a motor vehicle and through a switch-actuating wheel mounted thereon, Fig. 2 is the section taken along the line II—II of Fig. 1 showing the selector switch for the turn indicators in its neutral position, Fig. 3 is a view similar to that of Fig. 2 showing the selector switch in the position to select one of the turn indicators, and Fig. 4 is a view similar to that of Figs. 2 and 3 showing the selector switch in the position to select the other turn indicator.

As will appear from Fig. 1, an actuating wheel having spokes 2 is mounted on the steering wheel 1. More particularly, the hub portion 3 of the actuating wheel is rotatably and tiltably mounted on an external shoulder 4 of the hub 5 of the steering wheel. The hub portion 3 of the actuating wheel and a dome-shaped plate 36 forming a removable part thereof constitute an outer cap covering the hub 5 and having peripheral contact therewith. A contact-carrying member in form of a metal plate 6 is disposed beneath the cap and is fixed to the hub portion 3 by rivets, such as 52. The hub 5 forms a base member including a plate 7 of insulating material which is mounted on an internal shoulder of the hub 5 and is fixed thereto by a number of screws including a screw 50. A central stop member 11 overlies the contact-carrying member 6 but is normally spaced therefrom, and means are provided for securing the stop member 11 to the base. In the embodiment shown, the central stop member 11 is formed by a nut, and the means for securing it to the base comprises a threaded stem 8 fixed to the base plate 7 in coaxial position and having external threads engaging the nut 11. The hub 5 has a central bore through which electrical cables extend. The stem 8 has a downward extension 10 projecting beneath the base plate into the central bore of the hub 5 between the cables to thereby guide the same. To control the horn of the motor vehicle a first switch is provided being formed by a pair of contacts 12 and 15, one of which is mounted on the stop member 11, while the other is mounted on the contact-carrying plate 6.

It will be noted that the contact 12 is formed by a flanged washer which is in electrical connection through the nut 11 with the stem 8, 10. The latter is provided with a bore 51 into which the conductor of an electrical cable may be introduced and held therein by a suitable clamping screw not shown. The other contact 15 is formed by a cup-shaped annular metal member inserted in a central depression of plate 6.

A helical pressure spring 13 is inserted between the stop member 11 and the contact-carrying plate 6 and surrounds the stem 8. In order to prevent the spring from short-circuiting the contacts 12 and 15, a washer 14 of insulating material is inserted in the cup-shaped contact 15 and serves as a rest for the helical spring 13. By adjustment of the nut 11 the distance between the contacts 12 and 15 may be adjusted as desired.

A second switch adapted to select one or the other of a pair of turn indicators is formed by elements 17, 22, 23 and 24 which are mounted on the base member 7 and the contact-carrying member 6 and are responsive to relative rotation thereof. In the embodiment shown, the switch element 17 is formed by a vertical headed metal stem axially movable in a cup-shaped bushing 19 of insulating material which is inserted in a bore of and fixed to the contact-carrying plate 6. A spring 18 in the bushing 19 surrounds the stem 17 and rests on an internal shoulder of the bushing 19 and on an external shoulder of the stem 17 tending to press the same downwardly to thereby engage the head of the stem 17 with the base plate 7 and the contacts 22, 23 or 24 inserted therein. The upper end of the stem 17 projects through a hole in the bottom of the cup-shaped bushing 19 and has a small head thus limiting the downward stroke of the stem 17 relative to the contact-carrying member 6.

Relative rotation of the steering wheel and of the actuating wheel is limited by a pin 21 fixed to and projecting upwardly from the base plate 7 and extending into a peripheral recess of the contact-carrying plate 6, such recess having shoulders 20 which are normally so spaced from the pin 21 as to permit rotation of the actuating wheel from its normal position shown to one or the other of two actuated positions. Each of the three contacts 22, 23 and 24 which are inserted in recesses of the base plate 7 and have flat tops substantially flush with or slightly projecting above the base plate, is connected with a terminal screw 37, 38, or 39 respectively, for connection thereto of a conductor. The countercontact formed by the head of stem 17 has a width enabling it to simultaneously engage either contacts 22 and 23 or contacts 22 and 24 when the actuating wheel is turned from its normal position into one or the other of its actuated positions shown in Figs. 3 and 4, whereby an electrical connection is established between the contacts 22 and 24 as shown in Fig. 3, or between the contacts 22 and 23 as shown in Fig. 4.

For resiliently holding the actuating wheel in its normal position or in one of its actuated positions, a detent device is provided which is composed of a toothed element 29 and of a detent element 25 which is movable for resilient engagement with the toothed element, one of the elements being mounted on the base member 7 and the other one on the contact-carrying member 6. In the embodiment shown, the toothed element 29 is in form of a plate fixed to the base plate 7 and having four teeth. The detent element is a stud 25 depending from a lever 27 which is pivotally mounted on a pivot 28 fixed to the contact-carrying plate 6. A helical tension spring 26 is anchored to the contact-carrying member 6 and to the lever 27 and tends to engage the stud 25 with one of the three tooth gaps 30, 31, 32 of the plate 29. Finally, an electrical signal bulb 33 is mounted on the base plate 7 beneath a colored window 34, 35 provided in the dome-shaped plate 36. The cable connected to the terminal screw 37 leads to one of the two turn indicators, and the cable connected to the terminal screw 38 leads to the other turn indicator. A conducting strip leads from the central contact 22 to the terminal screw 39, and another conducting strip leads from the terminal screw 40 to the central pole of the bulb 33.

The function of the novel electrical device is as follows: When the driver wishes to sound the horn he must tilt the actuating wheel by depressing any desired peripheral point of its rim. In so doing he will pivot the outer cap 3, 36 about a line tangential to its periphery at any point thereof, such as point a or point b. The pivotal movement will be limited by engagement of the flange of cup-shaped contact 15 with the contact washer 12 depressing the helical spring 13. A circuit will be closed from the live terminal of the battery through the horn, the cable leading to bore 51 of stem 8, 10, nut 11, washer-shaped contact 12, cup-shaped contact 15, contact-carrying plate 6, hub portion 3, hub 5 of the steering wheel and through the ground to the grounded terminal of the battery. When the driver releases the actuating wheel the spring 13 will restore the actuating wheel 2, 3 to its normal position separating the contacts 12 and 15 thereby interrupting the operating circuit for the horn.

Normally the detent device holds the actuating wheel in the central angular position relative to the steering wheel as shown in Fig. 2. In this position the stem 17 engages the central contact 22 and both of the turn indicators are de-energized. When the driver wishes to turn to the right or to the left he will rotate the actuating wheel 2, 3 in the same sense bringing the parts to the position shown in Figs. 3 or 4. The stud 25 of the detent lever 27 will engage the tooth gap 30 or the tooth gap 32 of the toothed detent plate 29. The counter-contact formed by stem 17 will move either to the position 17′ shown in Fig. 3 establishing a connection between contacts 22 and 24, or will move to the position 17″ shown in Fig. 4 establishing a connection between the contacts 22, 23. When the parts assume the position shown in Fig. 3 a circuit will be established as follows: Ground, turn indicator for left hand turns, cable to contact 24, head of stem 17, contact 22, conductive strip 41, contact 39, metal plate 29, bulb 33, strip 41′, terminal screw 40, and a cable leading to the live terminal of the battery. In this circuit the indicator for a left hand turn will be operated and the signal lamp 33 will be lighted. A right hand turn is indicated by a similar operation in which a circuit is established through the contact 23 as shown in Fig. 4.

The sides of tooth gaps 30 and 32 are preferably less inclined than the sides 21 and 22 (Fig. 2) of the central tooth gap 31. This has the effect that the driver must apply more physical effort to turn the actuating wheel from its normal position than he must apply for restoring the actuating wheel from actuated position to normal position. In other words, the stud 25 will more easily jump back into the central tooth gap 31 than it will leave the same. Owing to such arrangement, the actuating wheel is less liable to overthrow when being restored to neutral position.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. An electrical control device comprising a base member forming the hub of a steering wheel of a motor vehicle, an actuating wheel having a hub portion rotatably and tiltably mounted on said base member and forming an outer cap covering said base member and having peripheral contact therewith, a contact-carrying member covered by and fixed to said cap, a central stop member overlying but normally spaced from said contact-carrying member, means for securing said stop member to said base member in coaxial relationship thereto in which said stop member limits tilting movement of said actuating wheel without interfering with a rotation thereof relative to said steering wheel, a first switch adapted to control the horn of the motor vehicle and formed by a pair of contacts mounted on said stop member and said contact-carrying member respectively, and adapted to be engaged by said tilting movement, and a second switch adapted to select a turn indicator and formed by elements mounted on said members and responsive to relative rotation thereof, and a pressure spring inserted between said stop member and said contact-carrying member and normally tending to depress said cap on said hub to thereby resist closing of said first switch.

2. An electrical control device as claimed in claim 1 in which said means is formed by a threaded stem fixed to said base member in coaxial position, said central stop member being formed by a nut secured on said stem so as to engage one contact of said pair of contacts.

3. An electrical control device as claimed in claim 1 in which said hub has a central bore, electrical cables extending through said bore to at least one of said switches, said means being formed by a stem centrally secured to said base member and extending into said bore between said cables, and a nut secured upon said stem and constituting said central stop member.

4. An electrical control device comprising a base member forming the hub of a steering wheel of a motor vehicle, an actuating wheel having a hub portion rotatably and tiltably mounted on said base member and forming a cap covering said base member, a contact-carrying member covered by and fixed to said cap, a central stop member overlying but normally spaced from said contact-carrying member, means for securing said stop member to said base member in coaxial relationship thereto in which said stop member limits tilting movement of said actuating wheel without interfering with a rotation thereof relative to said steering wheel, a first switch adapted to control the horn of the motor vehicle and formed by a pair of contacts mounted on said stop member and said contact-carrying member respectively, and adapted to be engaged by said tilting movement, and a second switch adapted to select a turn indicator and formed by elements mounted on said members and responsive to relative rotation thereof, a pressure spring inserted between said stop member and said contact-carrying member and normally tending to depress said cap on said hub to thereby resist closing of said first switch, and a detent device composed of a toothed element and of a detent element movable for resilient engagement therewith, one of said elements being mounted on said base member and the other one of said elements being mounted on said contact-carrying member.

5. An electrical control device comprising a base member forming the hub of a steering wheel of a motor vehicle, an actuating wheel having a hub portion rotatably and tiltably mounted on said base member and forming a cap covering said base member, a contact-carrying member covered by and fixed to said cap, a central stop member overlying but normally spaced from said contact-carrying member, means for securing said stop member to said base member in coaxial relationship thereto in which said stop member limits tilting movement of said actuating wheel without interfering with a rotation thereof relative to said steering wheel, a first switch adapted to control the horn of the motor vehicle and formed by a pair of contacts mounted on said stop member and said contact-carrying member respectively, and adapted to be engaged by said tilting movement, and a second switch adapted to select a turn indicator and formed by elements mounted on said members and responsive to relative rotation thereof, a pressure spring inserted between said stop member and said contact-carrying member and normally tending to depress said cap on said hub to thereby resist closing of said first switch, a toothed plate secured to said base member, a lever pivotally mounted on said contact-carrying member, a stud on said lever adapted to engage the teeth of said plate, and a spring anchored to said contact-carrying member and said lever and tending to engage said stud with the teeth of said plate.

6. An electrical control device comprising a base member forming the hub of a steering wheel of a motor vehicle, an actuating wheel having a hub portion rotatably and tiltably mounted on said base member and forming a cap covering said base member, a contact-carrying member covered by and fixed to said cap, a central stop member overlying but normally spaced from said contact-carrying member, means for securing said stop member to said base member in coaxial relationship thereto in which said stop member limits tilting movement of said actuating wheel without interfering with a rotation thereof relative to said steering wheel, a first switch adapted to control the horn of the motor vehicle and formed by a pair of contacts mounted on said stop member and said contact-carrying member respectively, and adapted to be engaged by said tilting movement, and a second switch adapted to select a turn indicator and formed by elements mounted on said members and responsive to relative rotation thereof, a pressure spring inserted between said stop member and said contact-carrying member and normally tending to depress said cap on said hub to thereby resist closing of said first switch, said second switch comprising three spaced contacts mounted on said base member, a countercontact, and means for resiliently mounting said countercontact on said contact-carrying member for selective engagement with said spaced contacts, said countercontact having a width sufficient for simultaneous engagement of two adjacent ones of said contacts.

References Cited in the file of this patent
UNITED STATES PATENTS

| | | |
|---|---|---|
| 1,876,165 | Punke | Sept. 6, 1932 |
| 2,077,670 | Brush | Apr. 20, 1937 |
| 2,196,705 | Murray | Apr. 9, 1940 |
| 2,267,460 | Herreshoff et al. | Dec. 23, 1941 |
| 2,279,400 | Holm | Apr. 14, 1942 |

FOREIGN PATENTS

| | | |
|---|---|---|
| 875,901 | France | July 7, 1942 |